(12) United States Patent
Cogley

(10) Patent No.: US 10,743,648 B1
(45) Date of Patent: Aug. 18, 2020

(54) ANIMAL TOOTHBRUSH SYSTEM

(71) Applicant: Thomas Paul Cogley, Pinellas Park, FL (US)

(72) Inventor: Thomas Paul Cogley, Pinellas Park, FL (US)

( * ) Notice: Subject to any disclaimer, the term of this patent is extended or adjusted under 35 U.S.C. 154(b) by 272 days.

(21) Appl. No.: 15/889,092

(22) Filed: Feb. 5, 2018

Related U.S. Application Data

(60) Provisional application No. 62/454,995, filed on Feb. 6, 2017.

(51) Int. Cl.
| | | |
|---|---|---|
| *A46B 11/00* | (2006.01) |
| *A46B 15/00* | (2006.01) |
| *A61D 7/00* | (2006.01) |
| *A01K 25/00* | (2006.01) |
| *A61D 5/00* | (2006.01) |

(52) U.S. Cl.
CPC .......... *A46B 11/0086* (2013.01); *A01K 25/00* (2013.01); *A46B 15/0055* (2013.01); *A61D 5/00* (2013.01); *A61D 7/00* (2013.01); *A46B 2200/1086* (2013.01)

(58) Field of Classification Search
CPC . A61D 5/00; A61D 7/00; A01K 25/00; A01K 15/025; A61C 19/04; A61C 19/043; A61C 19/063; A61C 1/10; A61C 1/16; A61C 1/18; A61C 3/00; A46B 11/0086; A46B 15/0055; A46B 2200/1086
See application file for complete search history.

(56) References Cited

U.S. PATENT DOCUMENTS

| | | | | |
|---|---|---|---|---|
| 3,417,762 | A * | 12/1968 | Hall | A46B 11/0024 401/176 |
| 4,155,663 | A * | 5/1979 | Cerquozzi | A46B 11/0041 401/135 |
| 5,346,324 | A * | 9/1994 | Kuo | A46B 11/0055 401/146 |
| 6,164,246 | A * | 12/2000 | Naftaly | A01K 25/00 119/720 |
| 6,241,412 | B1 * | 6/2001 | Spies | A46B 11/002 206/532 |
| 6,685,375 | B1 * | 2/2004 | Crocker | A46B 7/04 401/176 |
| 7,112,003 | B2 * | 9/2006 | Frison | A46B 5/02 401/176 |
| 8,506,196 | B2 * | 8/2013 | Boyd | A46B 15/0081 401/198 |
| 9,021,992 | B1 * | 5/2015 | Cogley | A61D 5/00 119/831 |

(Continued)

*Primary Examiner* — Nicholas D Lucchesi

(57) ABSTRACT

The handle has a proximal end and a distal end. The handle has an intermediate extent between the handle and the distal end. The housing has a handle adjacent to the proximal end. The housing has a head adjacent to the distal end. The housing has a plurality of tufts of bristles extending at right angles from the head. A toothpaste cartridge is provided within the handle. The handle has an intermediate component operatively coupled to the cartridge below. The intermediate component is operatively coupled to the head above. The head has a plurality of holes adjacent to the tufts. The intermediate component has a plurality tubes. The tubes operatively couple the cartridge and the holes. At least one valve is provided between the cartridge and the holes. In this manner the backlog of toothpaste is abated.

2 Claims, 4 Drawing Sheets

(56) References Cited

U.S. PATENT DOCUMENTS

| | | | | |
|---|---|---|---|---|
| 9,155,602 B1* | 10/2015 | Cogley | ................. | A01K 25/00 |
| 10,172,326 B1* | 1/2019 | Cogley | ................. | A01K 25/00 |
| 10,517,272 B1* | 12/2019 | Cogley | ................. | A01K 15/00 |
| 10,517,273 B2* | 12/2019 | Bess | ..................... | A01K 25/00 |
| 2012/0178041 A1* | 7/2012 | Cogley | ................. | A01K 25/00 |
| | | | | 433/1 |
| 2013/0252192 A1* | 9/2013 | Cogley | ................. | A01K 25/00 |
| | | | | 433/1 |

* cited by examiner

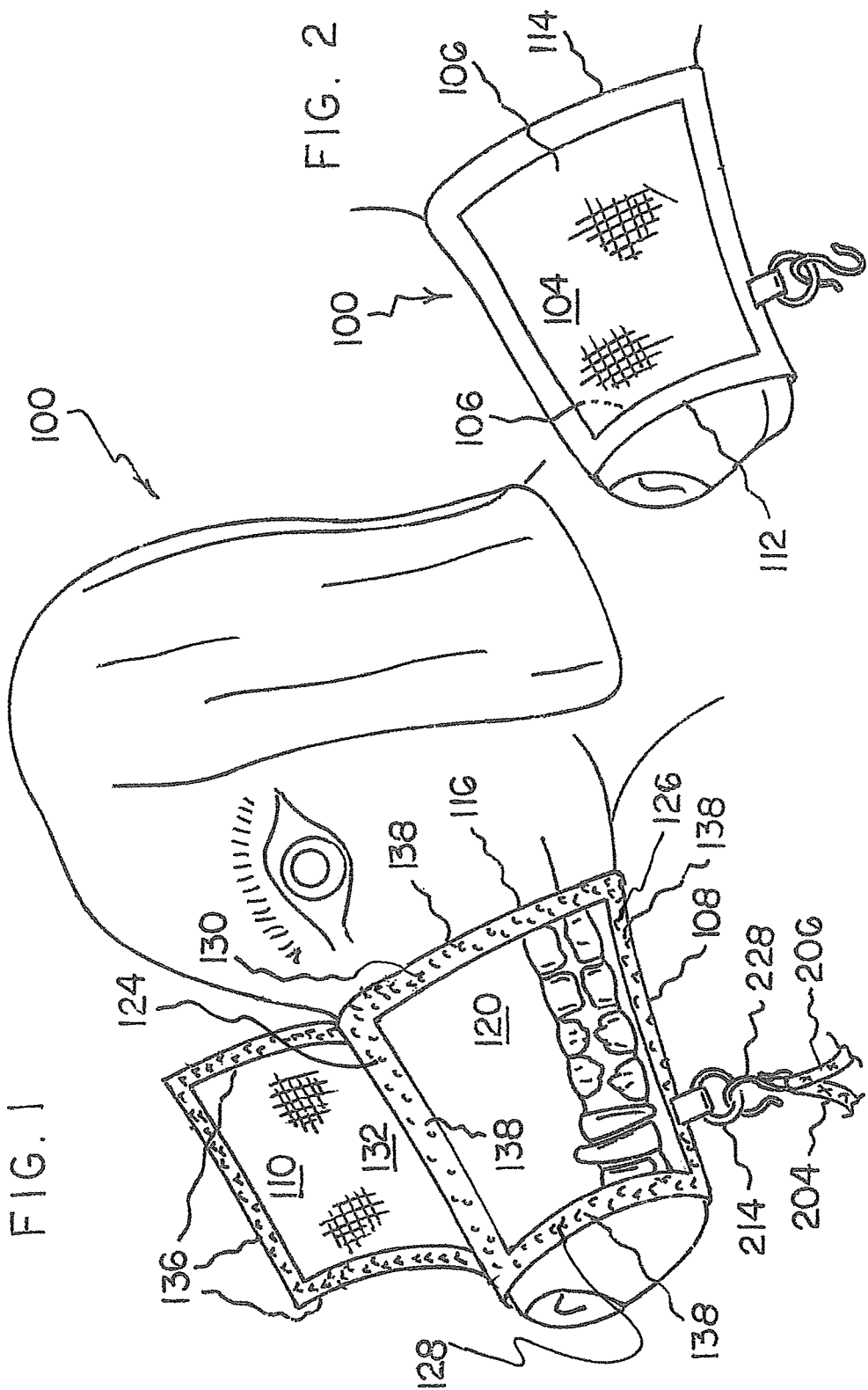

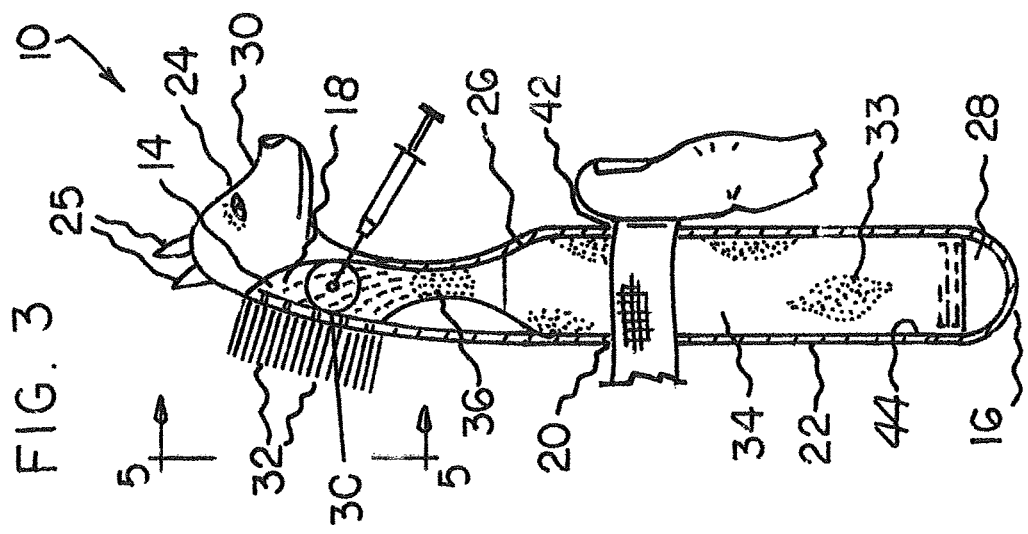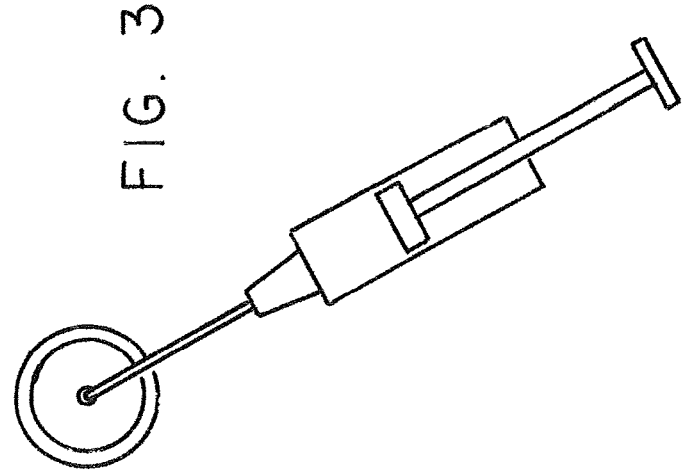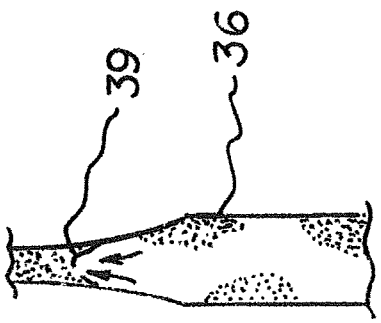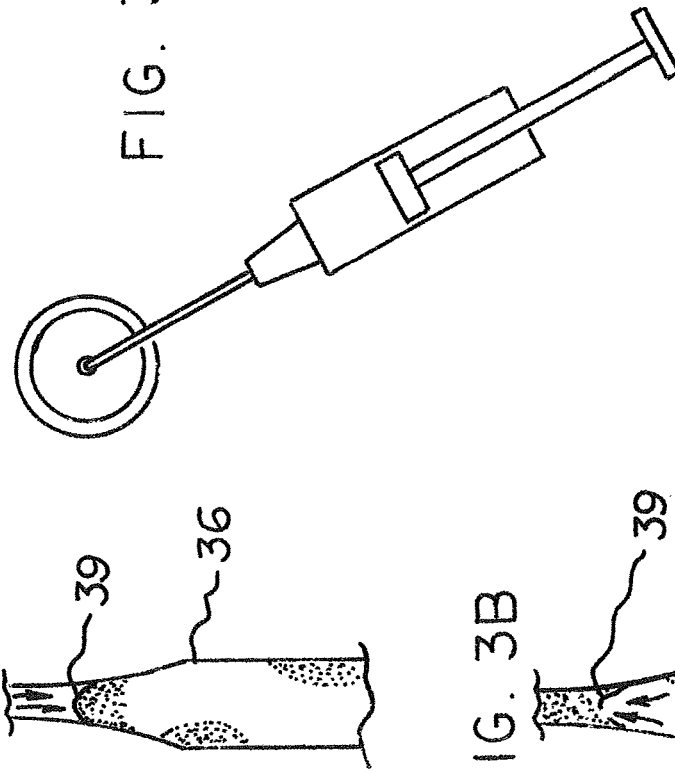

ANIMAL TOOTHBRUSH SYSTEM

BACKGROUND OF THE INVENTION

Field of the Invention

The present invention relates to an animal toothbrush system and more particularly pertains to removably positioning adjacent to a face of a pet, retaining a jaw of the pet closed and selectively providing access to an oral cavity of the pet, the positioning and retaining and brushing being done economically in a safe and convenient manner to the pet and by a caregiver.

Description of the Prior Art

The use of tooth brushing systems is known in the prior art. More specifically, toothbrush systems previously devised and utilized for the purpose of retaining a jaw are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe the toothbrush system that allows for maximum convenience.

In this respect, the toothbrush system according to the present invention substantially departs from the conventional concepts and designs of the prior art, and in doing so provides an apparatus primarily developed for the purpose of removably positioning adjacent to a face of an animal, retaining a jaw of the animal closed and selectively providing access to an oral cavity of the animal, the positioning and retaining and brushing being done economically in a safe and convenient manner to the animal and by a caregiver.

Therefore, it can be appreciated that there exists a continuing need for a new and improved toothbrush system which can be used for removably positioning adjacent to a face of pet, retaining a jaw of the pet closed and selectively providing access to an oral cavity of the pet, the positioning and retaining and brushing being done economically in a safe and convenient manner to the animal and to a care giver. In this regard, the present invention substantially fulfills this need.

SUMMARY OF THE INVENTION

In view of the foregoing disadvantages inherent in the known types of toothbrush systems now present in the prior art, the present invention provides an improved toothbrush system. As such, the general purpose of the present invention, which will be described subsequently in greater detail, is to provide a new and improved toothbrush system and method which has all the advantages of the prior art and none of the disadvantages.

From a broad viewpoint, the present invention is an animal toothbrush system. To attain this, the present invention essentially comprises a housing. The housing has a proximal end and a distal end. The housing has an intermediate extent between the handle and the distal end. The housing has a handle adjacent to the proximal end. The housing has a head adjacent to the distal end. The housing has a plurality of tufts extending at right angles from the head. A toothpaste cartridge is provided within the handle. The handle has an intermediate component operatively coupled to the cartridge below. The intermediate component is operatively coupled to the head above. The head has a plurality of holes adjacent to the tufts. The intermediate component has a plurality of tubes. The tubes operatively couple the cartridge and the holes. At least one valve is provided between the cartridge and the holes. In this manner back flow from the mouth is abated.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved toothbrush system which has all of the advantages of the prior art toothbrush systems and none of the disadvantages.

It is another object of the present invention to provide a new and improved toothbrush system which may be easily and efficiently manufactured and marketed.

It is further object of the present invention to provide a new and improved toothbrush system which is of durable and reliable constructions.

An even further object of the present invention is to provide a new and improved toothbrush system which is susceptible of a low cost of manufacture with regard to both materials and labor, and which accordingly is then susceptible to low prices of sale to the consuming public, thereby making such toothbrush system economically available to the buying public.

Lastly, another object of the present invention is to provide a toothbrush system for removably positioning adjacent to a face of an animal, retaining a jaw of the animal closed and selectively providing access to an oral cavity of the patient, the positioning, retaining and brushing being done economically in a safe and convenient manner to the animal and to a caregiver.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a muzzle for use with an animal toothbrush system constructed in accordance with the principles of the present invention.

FIG. 2 is a perspective view of the muzzle of FIG. 1 but with the muzzle in a closed orientation.

FIG. 3 is a side elevational view of an animal toothbrush for use with the muzzle of FIG. 1.

FIG. 3A is a side elevational view of a central extent of the cartridge of FIG. 3.

FIG. 3B is a side elevational view of a central extent of the toothbrush cartridge similar to FIG. 3A but in a squeezed toothpaste dispensing mode.

FIG. 3C is a front elevational view of a of a syringe for injecting medication into the toothpaste prior to administering to an animal.

The same reference numerals refer to the same parts throughout the various Figures.

DESCRIPTION OF THE PREFERRED EMBODIMENT

Figure 5:
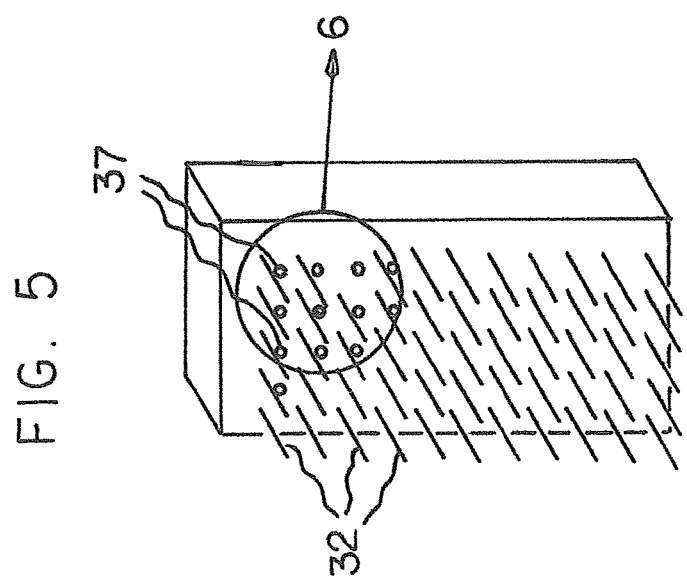
FIG. 5 is a perspective view of the toothbrush head taken along line 5-5 of FIG. 3.
Figure 4:
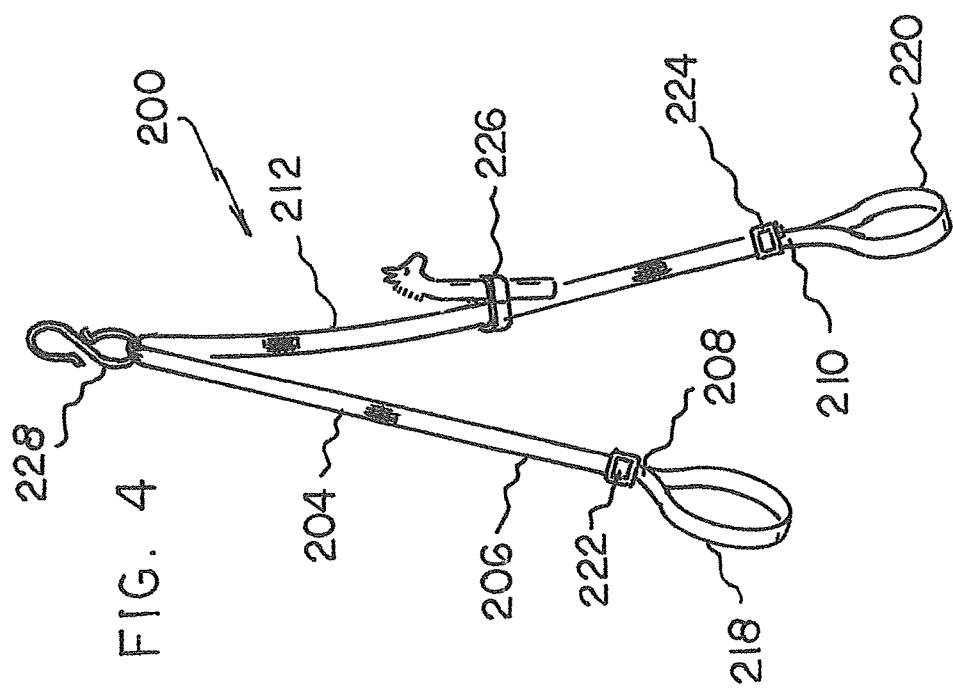
FIG. 4 is a perspective view of a leash for use with the muzzle of FIG. 1 and the toothbrush of FIG. 3.
Figure 7:
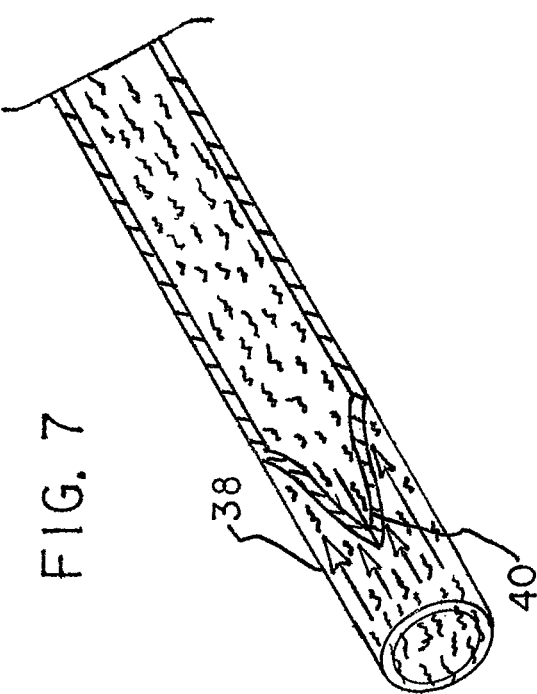
FIG. 7 is an enlarged view showing of a portion of the toothbrush head taken at ellipsoid 7 of FIG. 6.
Figure 6:
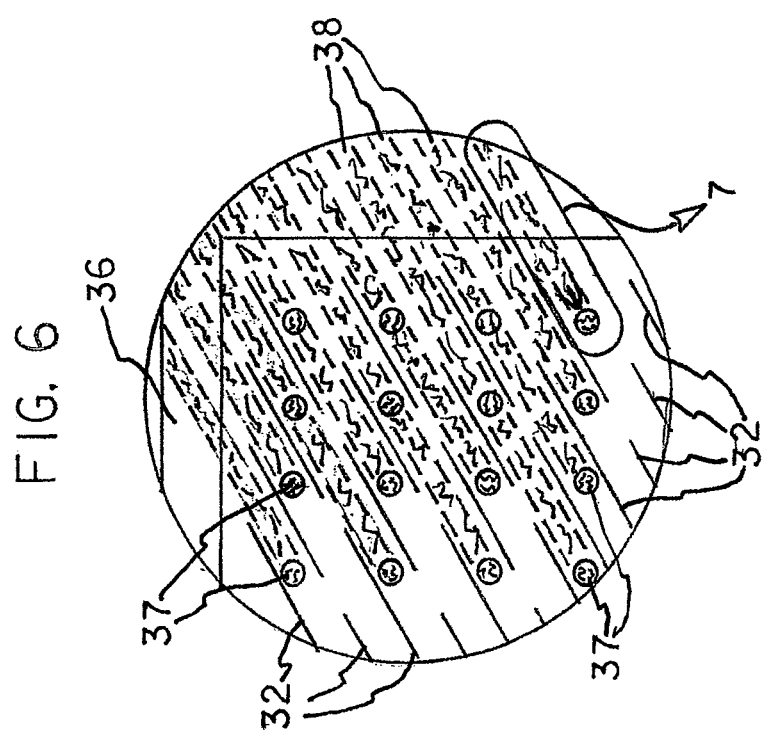
FIG. 6 is an enlarged view showing of a portion of the toothbrush head taken at circle 6 of FIG. 5.

With reference now to the drawings, and in particular to FIG. 1 thereof, the preferred embodiment of the new and improved toothbrush system embodying the principles and concepts of the present invention and generally designated by the reference numeral 10 will be described.

The present invention, the toothbrush system 10 is comprised of a plurality of components. Such components in their broadest context include a handle, a housing, a toothpaste cartridge, and a valve. Such components are individually configured and correlated with respect to each other so as to attain the desired objective.

From a specific viewpoint, the present invention is a pet toothbrush system.

First provided is a housing 14. The housing has a proximal end 16. The housing has a distal end 18. The housing has an intermediate extent 20. The intermediate extent is provided between the proximal end and the distal end. The housing has a handle 22. The handle is provided adjacent to the proximal end. The housing also has a head 24. The head includes rigid ears 25 to facilitate removal of plaque. The head is provided adjacent to the distal end. The housing is hollow. In this manner a chamber 26 is provided within the handle, the head, and between the handle and the head.

The handle has an opening. The opening is provided adjacent to the proximal end. A hemispherical cap 28 is provided. The hemispherical cap is threaded. In this manner the hemispherical cap is adapted to be coupled to the handle. The housing includes a decorative image 30. The decorative image is animal head. The decorative imagine is provided adjacent to the distal end. The housing has a plurality of tufts 32 of bristles. The tufts of bristles extend at right angles from the head adjacent to the distal end. A cartridge 34 is provided. The cartridge is removably received within the handle. Toothpaste 33 is provided within the cartridge.

The housing has an intermediate component 36. The intermediate component is operatively coupled to the cartridge below. The intermediate component is operatively coupled to the head above. The head has a plurality of holes 37. The holes are provided adjacent to the tufts. The intermediate component has a plurality of tubes 38. The plurality of tubes includes a lower valve 39. The lower valve is provided adjacent to the cartridge. Each tube has an upper valve (40). The upper valve is adjacent to an associated hole. In this manner the backlog of toothpaste through the holes is abated after squeezing the housing and the cartridge to dispense toothpaste.

When the handle 22 is squeezed at 42, the toothpaste travels through the lower valve 40 proceeding through the chamber 44 and into the plurality of tubes 38 thereby being applied to the bristles 32.

A muzzle 104 is provided. The muzzle has a first side section. The muzzle has a second side section 106. The muzzle has a lower section 108. The muzzle has an upper section 110. The muzzle has a nose hole 112. In this manner the animal may breathe. The muzzle has a rear 114. In this manner the muzzle is removably positioned on the face of a pet 116. The muzzle has first side section. The muzzle has a rectangular cutout 120. The cutout is formed in the first side section of the muzzle. The cutout has a top 124. The cutout has a bottom 126. The cutout has a left side 128. The cutout has a right side 130. The cutout has a rectangular flap 132. The flap has a top. The flap has a bottom. The flap also has a left side. The flap has a right side. The flap is in a configuration 134 and a size to cover the cutout.

Provided next is a securement assembly. The securement assembly includes hook and loop fasteners 138. The hook and loop fasteners are provided along the top and the bottom and the left side and the right side adjacent to the cutout. The securement assembly includes hook and loop fasteners 136. The hook and loop fasteners along the bottom and the left side and the right side of the flap.

Provided last is a leash 204. The leash has a flexible strap 206. The strap has a first end 208. The strap has a second end 210. The strap has an intermediate extent 212. A ring 214 is provided. The ring couples the intermediate extent to the muzzle. The strap has a first loop 218. The first loop is provided at the first end. In this manner a first handle is formed. The strap has a second loop 220. The second loop is provided at the first end. In this manner a second handle is formed. The strap has a sliding clip 222. The sliding clip is provided at the first end. The sliding clip is slidably coupled to the strap adjacent to the first end. In this manner the size of the first loop may be varied. The strap has a second slide clip 224. The second slide clip is provided at the second end. The second slide clip is slidably coupled to the strap adjacent to the second end. In this manner the size of the second loop may be varied. The strap has a third loop 226. The leash has a removable clip 228. In this manner the leash removably receives the toothbrush.

Lastly provided is a syringe 302 for injecting medication 304 by a needle 306 through the housing into toothpaste prior to administering to an animal. This allows for buccal medication administration.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An animal toothbrush system including:
   a toothbrush, the toothbrush having a housing, a proximal end and a distal end and an intermediate extent there between, the housing having a handle adjacent to the proximal end, the housing having a head adjacent to the distal end, the housing having a plurality of tufts of bristles extending at right angles from the head, a toothpaste cartridge within the handle, an intermediate component operatively coupled to the cartridge below and to the head above, a plurality of holes in the head adjacent to the tufts, the intermediate component having a plurality of tubes, the plurality of tubes operatively coupling the cartridge and the holes, at least one valve between the cartridge and the holes to abate backlog of toothpaste;
   a muzzle (104), the muzzle having first and second side sections (106), a lower section (108), an upper section (110), with a nose hole (112) for breathing purposes and a rear (114) for removably positioning the muzzle on a face of an animal (116), a rectangle cutout (120) formed in the first side section of the muzzle, the rectangular cutout having a top (124) and a bottom (126) and a left side (128) and a right side (130), a rectangular flap (132) having a top and a bottom and a left side and a right side, the flap having a configuration and a size to cover the cutout, a securement assembly including hook and loop fasteners (138) along the top and the bottom and the left side and the right side adjacent to the cutout, the secuement assembly including hook and loop fasteners (136) along the bottom and the left side and the right side of the flap;
   a leash (204) formed of a flexible strap (206) having a first end (208) and a second end (210) and an intermediate extent (212), a ring (214) coupling the intermediate extent to the muzzle, a first loop (218) at the first end providing a first handle, a second loop (220) at the first end providing a second handle, a first sliding clip (222) at the first end slidably coupled to the strap adjacent to the first end to vary the size of the first loop, a second slide clip (224) at the second end slidably coupled to the strap adjacent to the second end to vary the size of the second loop, a third loop (226) in the strap for removably receiving the toothbrush.

2. A toothbrush system (10) for removable positioning adjacent to a face of an animal, retaining a jaw of the animal closed and selectively providing access to an oral cavity of the animal, the positioning and retaining and brushing being done economically in a safe and convenient manner to the animal and by a caregiver, including, in combination:
   a housing (14) with a proximal end (16) and a distal end (18) and an intermediate extent (20) there between, the housing having a handle (22) adjacent to the proximal end, the housing having a head (24) adjacent to the distal end, the head including a decorative animal head image (30), the head including rigid ears (25) to facilitate removal of plaque, the housing being hollow and forming a chamber (44) in the handle and the head and there between, the handle adjacent to the proximal end having an opening with a hemispherical cap (28) threadedly coupleable to the handle, the housing having a plurality of tufts (32) of bristles extending at right angles from the head adjacent to the distal end, a cartridge (34) within the handle, toothpaste (33) within the cartridge, an intermediate component (36) operatively coupled to the cartridge below and to the head above, a plurality of holes (37) in the head adjacent to the tufts, the intermediate component having a plurality of tubes (38), the plurality of tubes including a lower valve (39) adjacent to the cartridge, each tube having an upper valve (40) adjacent to an associated hole, the upper and lower valves functioning to abate a backlog of toothpaste after squeezing the housing and the cartridge to dispense toothpaste from the cartridge though the holes;
   a muzzle (104), the muzzle having first and second side sections (106), a lower section (108), an upper section (110), and with a nose hole (112) for breathing purposes and a rear (114) for removably positioning the muzzle on a face of an animal (116), a rectangular cutout (120) formed in the first side section of the muzzle, the rectangular cutout having a top (124) and a bottom (126) and a left side (128) and a right side (130), a rectangular flap (132) having a top and a bottom and a left side and a right side, the flap having a configuration and a size to cover the cutout;
   a securement assembly including hook and loop fasteners (138) along the top and the bottom and the left side and the right side adjacent to the cutout, the securement assembly including hook and loop a fasteners (136) along the bottom and the left side and the right side of the flap;
   a leash (204) formed of a flexible strap (206) having a first end (208) and a second end (210) and an intermediate extent (212), a ring (214) coupling the intermediate extent to the muzzle, a first loop (218) at the first end providing a first handle, a second loop (220) at the first end providing a second handle, a first sliding clip (222) at the first end slidably coupled to the strap adjacent to the first end to vary the size of the first loop, a second slide clip (224) at the second end slidably coupled to the strap adjacent to the second end to vary the size of the second loop, a third loop (226) in the strap and a removable clip (128) on the leash for removably receiving the toothbrush; and
   a syringe (302) for injecting medication (304) by a needle (306) through the housing (14) into toothpaste (308) prior to administering to an animal.

\* \* \* \* \*